United States Patent [19]

Ueda et al.

[11] Patent Number: 5,296,565
[45] Date of Patent: Mar. 22, 1994

[54] OLEFIN POLYMERIZATION CATALYST AND OLEFIN POLYMERIZATION

[75] Inventors: Takashi Ueda; Okawa Kazunori, both of Kuga, Japan

[73] Assignee: Mitsui Petrochemical Industries, Ltd., Tokyo, Japan

[21] Appl. No.: 42,393

[22] Filed: Apr. 2, 1993

Related U.S. Application Data

[62] Division of Ser. No. 885,986, May 20, 1992.

[30] Foreign Application Priority Data

| May 20, 1991 | [JP] | Japan | 3-114450 |
| May 20, 1991 | [JP] | Japan | 3-114451 |
| Jan. 16, 1992 | [JP] | Japan | 4-5962 |
| Jan. 16, 1992 | [JP] | Japan | 4-5963 |

[51] Int. Cl.$^5$ .............................................. C08F 4/66
[52] U.S. Cl. ................................... 526/114; 526/113; 526/129; 526/160; 526/348.6; 526/348.7; 526/352; 526/904; 502/113
[58] Field of Search ................ 526/113, 114, 129, 160

[56] References Cited

U.S. PATENT DOCUMENTS

| 4,874,734 | 10/1989 | Kioka et al. | 502/104 |
| 4,935,474 | 6/1990 | Ewen et al. | 526/114 |
| 4,937,217 | 6/1990 | Chang | 502/111 |
| 4,937,301 | 1/1990 | Chang | 536/128 |

FOREIGN PATENT DOCUMENTS 0206794 12/1986 European Pat. Off.
0368644 5/1990 European Pat. Off.

Primary Examiner—Joseph L. Schofer
Assistant Examiner—David Wu
Attorney, Agent, or Firm—Sherman and Shalloway

[57] ABSTRACT

A solid catalyst for olefin polymerization comprising

[A] a particulate carrier composed of (i) an oxide of at least one element selected from among those belonging to the groups of II, III and IV of the periodic table, and containing (ii) at least 1.0 % by weight of water,

[B] an organoaluminum oxy compound, and

[C] a transition metal compound of a metal belonging to the group IV B of the periodic table containing a ligand having a cyclopentadienyl skeleton, wherein the organoaluminum oxy compound [B] and the transition metal compound [C] are supported on the particulate carrier [A].

13 Claims, 2 Drawing Sheets

OLEFIN POLYMERIZATION CATALYST AND OLEFIN POLYMERIZATION

This is a continuation of application Ser. No. 07/885,986 filed May 20, 1992.

FIELD OF THE INVENTION

This invention relates to olefin polymerization catalysts and olefin polymerization processes using said olefin polymerization catalysts, and more particularly to olefin polymerization catalysts capable of giving olefin polymers excellent in melt tension or olefin polymers excellent in melt tension, broad in molecular weight distribution and excellent in moldability as well in high polymerization activity, and to olefin polymerization processes using said catalysts.

BACKGROUND OF THE INVENTION

Known hitherto as catalysts for the preparation of α-olefin polymers, e.g. ethylene polymer or ethylene/α-olefin copolymers, are titanium based catalysts composed of titanium compound and organoaluminum compounds, or vanadium based catalysts composed of vanadium compounds and organoaluminum compounds.

Recently, novel Ziegler type catalysts composed of zirconium compounds and organoaluminum oxy compounds have been developed as catalysts for the preparation of ethylene/α-olefin copolymers in high polymerization activity, and processes for the preparation of ethylene/α-olefin copolymers using these novel catalysts have been proposed, for example, in Japanese Patent L-O-P Publns. Nos. 19309/1983, 35005/1985, 35006/1985, 35006/1985, 35007/1985, 35008/1985, etc.

These novel catalysts formed from the transition metal compounds and organoaluminum oxy compounds as proposed in the prior art are excellent in polymerization activity especially ethylene polymerization activity in comparison with the catalysts formed from transition metal compounds and organoaluminum compounds which have been known prior to the advent of the above-mentioned novel catalysts. Nevertheless, the majority of these novel catalysts are soluble in the reaction system and, in most cases, processes for the preparation of ethylene/α-olefin copolymers using these novel catalysts are applicable only to the solution polymerization system. When it is intended to prepare polymers high in molecular weight by using these catalysts, there is brought about such inconvenience that a markedly increased viscosity of the solution containing the resulting polymer will reduce productivity of the process, or there is involved such a problem that it becomes difficult to obtain spherical olefin polymers excellent in particle characteristics.

In the meantime, attempts have been made to polymerize olefins in the suspension or vapor phase polymerization system by using a catalyst composed of a transition metal compound and an organoaluminum oxy compound, at least one of the compounds has been supported on a porous inorganic oxide carrier such as silica, alumina and silica alumina.

For example, the above-mentioned Japanese Patent L-O-P Publns. Nos. 35006/1985, 35007/1985 and 35008/1985 describe to the effect that catalysts prepared by supporting transition metal compounds and organoaluminum oxy compounds on silica, alumina or silica alumina are useful in the preparation of ethylene/α-olefin copolymers.

Japanese Patent L-O-P Publications Nos. 106808/1985 and 106809/1985 disclose processes for the preparation of compositions containing polyethylene polymers and fillers, wherein ethylene is polymerized or ethylene and other α-olefin are copolymerized in the presence of a product obtained previously by contacting a highly active catalyst component containing a hydrocarbon-soluble titanium compound and/or zirconium compound with a filler, an organoaluminum compound and a filler which has affinity with polyolefins.

Japanese Patent L-O-P Publn. No. 31404/1986 discloses a process for the polymerization of ethylene or copolymerization of ethylene and other α-olefin in the presence of a mixed catalyst comprising a product obtained by reaction of trialkylaluminum with water in the presence of silicon dioxide or aluminum oxide, and a transition metal compound.

Japanese Patent L-O-P Publn. No. 276805/1986 discloses polymerization of olefin in the presence of a catalyst comprising a zirconium compound and a reaction mixture obtained by reacting a reaction mixture resulting from aluminoxane and trialkylaluminum with an inorganic oxide having a surface hydroxyl group such as silica.

Japanese Patent L-O-P Publns. Nos. 08610/1986 and 296008/1986 disclose processes for the polymerization of olefin in the presence of a catalyst having supported a transition metal compound such as metallocene and aluminoxane on a carrier such as inorganic oxide.

However, when olefins were polymerized or copolymerized in the suspension or vapor phase polymerization system in the presence of such solid catalyst components supported by carriers as mentioned above, the polymerization activity attained in these system was very low in comparison with the case of the above-mentioned solution polymerization system, and a bulk density of the polymer thereby formed was not sufficiently satisfactory.

Further, the polymers thus formed are required to have various characteristics according to the process by which they are molded or to the purpose for which they are used. For example, when an inflation film is molded at a high speed from the polymer as formed, the polymer used for must be selected from among those having a large melt tension considering their molecular weight in order to carry out a stable molding operation at a high speed without flickering or tearing the bubble. Similar characteristics are necessary for the polymer at the time of blow molding thereof in order to prevent the sagging or tearing-off of the polymer or at the time of T-die extrusion thereof in order to keep the shortage in breadth of film to a minimum. In the case of the copolymers, they are required to have a narrow composition distribution when formed into film in order to prevent the film from being sticky. Further, if the polymer has a narrow molecular weight distribution, the molding conditions therefor are sometimes limited, and according to the purposes for which the molded products are used, olefin polymers having a broad molecular weight distribution are required. The solid catalyst components supported on the carriers proposed hitherto were not found to satisfy such requirements as mentioned above.

OBJECT OF THE INVENTION

The present invention has been made in view of the prior art as mentioned above, and an object of the invention is to provide olefin polymerization catalysts capable of giving olefin polymers excellent in melt tension and of preparing spherical olefin polymers excellent in particle characteristics as high polymerization activity and, moreover, capable of giving copolymers having a narrow composition distribution when two or more monomers are copolymerized or capable of giving olefin polymers having the above-mentioned characteristics, a broad molecular weight distribution and excellent moldability, and polymerization processes of olefins using such olefin polymerization catalysts as mentioned above.

SUMMARY OF THE INVENTION

The solid catalyst for olefin polymerization according to the present invention is characterized in that said catalyst comprises

[A] a particulate carrier composed of (i) an oxide of at least one element selected from among those belonging to the groups II, III and IV of the periodic table and containing (ii) at least 1.0% by weight of water,

[B] an organoaluminum oxy compound and

[C] a transition metal compound of a metal belonging to the group IV B of the periodic table containing a ligand having a cyclopentadienyl skeleton, wherein the organoaluminum oxy compound [B] and the transition metal compound [C] are supported on the particulate carrier [A].

The prepolymerized catalyst for olefin polymerization according to the invention is characterized in that said prepolymerized catalyst comprises a solid catalyst comprising

[A] a particulate carrier composed of (i) an oxide of at least one element selected from among those belonging to the groups II, III and IV of the periodic table and containing (ii) at least 1.0% by weight of water,

[B] an organoaluminum oxy compound,

[C] a transition metal compound of a metal belonging to the group IV of the periodic table containing a ligand having a cyclopetadienyl skeleton, and a prepolymerized polyolefin formed on the solid catalyst, wherein in the prepolymerized catalyst the organoaluminum oxy compound [B] and the transition metal compound [C] are supported on the particulate carrier [A].

The olefin polymerization catalysts of the invention as illustrated above may further contain [D] an organoaluminum compound which is supported on the particulate carrier or not in addition to the above-mentioned components.

Furthermore, the above-mentioned [C] transition metal compound may include at least two kinds of transition metal compounds of metals belonging to the group IV of the periodic table.

The polymerization process of olefins according to the invention is characterized by polymerize or copolymerize the olefins in the presence of the above-mentioned catalyst and, if necessary, the organoaluminum compound.

In this figure, a numeral in a circular mark represents the number of the example and a numeral in a square mark represents the number of the comparative example.

Figure 2:
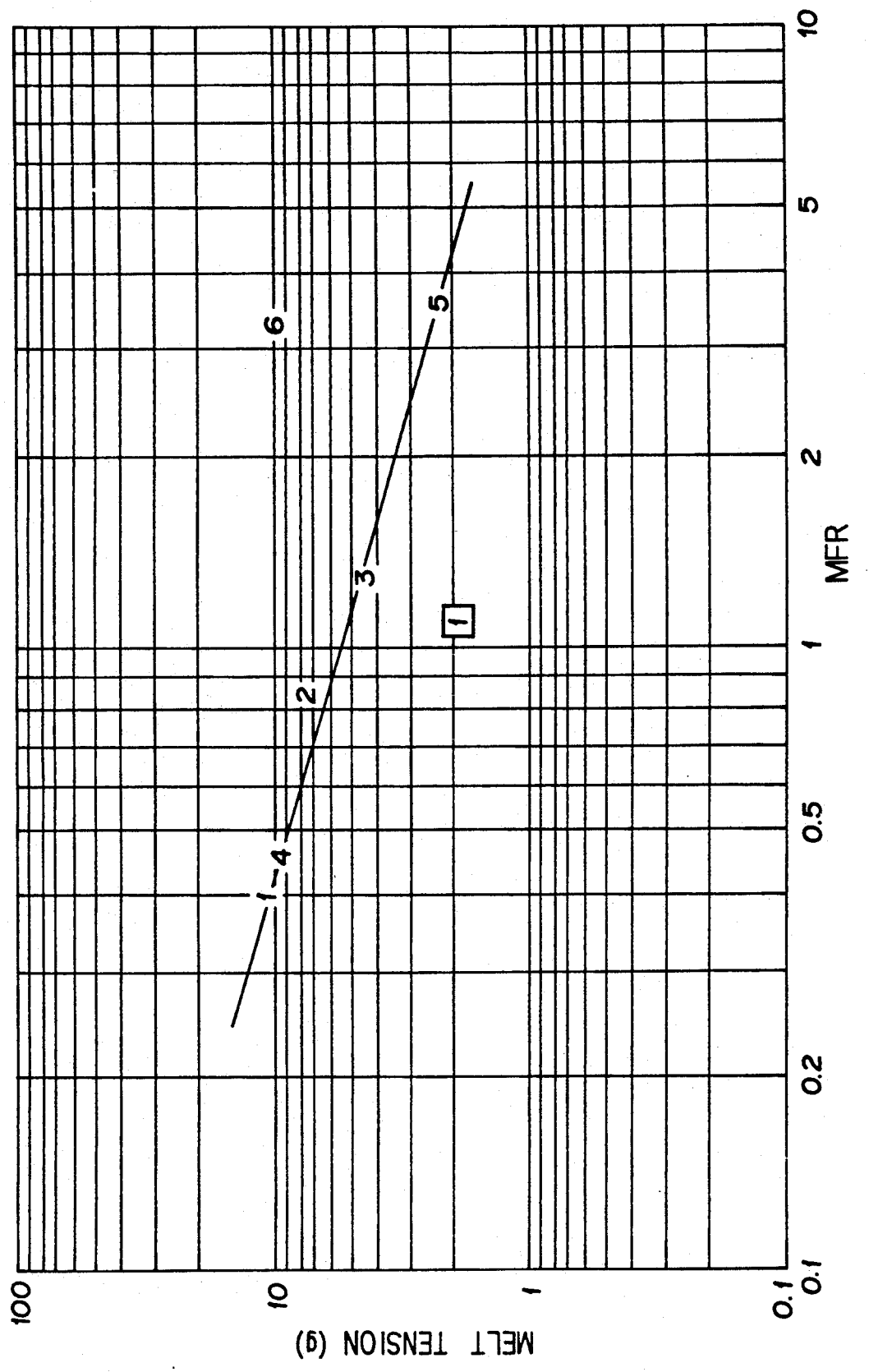

FIG. 2 is a graph showing the relationship between MFR and melt tension (MT) of the polymers obtained in Examples 9-14 and Comparative Example 2.

In this figure, a numeral in a circular mark represents the number of the example and a numeral in a square mark represents the number of the comparative example.

DETAILED DESCRIPTION OF THE INVENTION

The olefin polymerization catalysts and the polymerization process using said catalysts according to the present invention are illustrated below in detail.

In the present invention, the term "polymerization" used is intended sometimes to include not only homopolymerization but also copolymerization, and the term "polymer" used herein is intended sometimes to include not only homopolymer but also copolymer.

The particulate carrier [A] (hereinafter called sometimes "component [A]") used in the invention includes particulate inorganic compounds comprising an oxide of at least one element selected from among those belonging to the groups II, III and IV of the periodic table.

The particulate inorganic compounds mentioned above are preferably porous oxides including concretely $SiO_2$, $Al_2O_3$, MgO, $ZrO_2$, $TiO_2$, $B_2O_3$, CaO, ZnO, BaO, $ThO_2$, etc., or mixtures of porous oxides, for example, $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Of these particulate inorganic compounds, preferred are those consisting essentially of at least one component selected from the group consisting of $SiO_2$, $Al_2O_3$ and MgO, as a major component.

The particulate carrier [A] desirably has an average particle diameter of usually 1–300 $\mu$m, preferably 10–200 $\mu$m, a specific surface area of 50–1000 m$^2$/g, preferably 100–700 m$^2$/g, and a pore volume of 0.3–2.5 m$^3$/g.

The particulate carrier [A] used in the present invention contains at least 1.0% by weight, preferably 1.2–20% by weight and especially 1.4–15% by weight of water. The water contained in the particulate carrier [A] is meant the water held by adsorption on the surface of the particulate carrier.

The particulate carrier containing such specific amounts of water as mentioned above may be obtained, for example, by the following procedures.

(1) A procedure in which a carrier is held in moist air and allowed to undergo moisture adsorption until the moisture content of the carrier becomes an amount as specified.

(2) A procedure in which a carrier is held in moist air, allowed to undergo moisture adsorption and then dried until the moisture content of the carrier becomes an amount as specified.

(3) A procedure in which a specific amount of water is adsorbed on the surface of a thoroughly dried carrier. Concretely, in this procedure, the thoroughly dried carrier is stirred with the addition of the prescribed amount of water, water vapor, solution or suspension. In this case, the drying of the thus treated carrier at a temperature higher than about 200° C. usually attends elimination of the adsorbed water along with dehydration due to condensation of the surface of hydroxyl group.

The determination of the water content of the particulate carrier may be carried out by the method of loss in weight on heating. In the invention, a loss in weight of the particulate carrier obtained by drying the carrier under circulation of a dry vapor such as air or nitrogen at 200° C. for 4 hours is taken as the adsorbed water content of said carrier.

By virtue of the use of such particulate carrier containing specific amount of water as mentioned above, it is possible to obtain olefin polymerization catalyst components capable of preparing olefin polymers excellent in melt tension at high polymerization activity.

The organoaluminum oxy compound [B] (hereinafter called sometimes "component [B]") used in the invention may be aluminoxane hitherto known or such benzene-insoluble organoaluminum oxy compounds as exemplified in Japanese Patent L-O-P Publn. No. 78687/1990.

The known aluminoxane may be prepared, for example, by the following methods.

(1) A method wherein suspensions of compounds containing adsorbed water or salts containing water of crystallization, for example, magnesiumchloride hydrate, copper sulfate hydrate, aluminum sulfate hydrate, nickel sulfate hydrate and ceriun (I) chloride hydrate, in hydrocarbon solvents are allowed to react with an organoaluminum compound such as trialkylaluminum, and the desired aluminoxane is recovered as a hydrocarbon solution containing the same.

(2) A method wherein an organoaluminum compound such as trialkylaluminum is treated directly with water, ice or water vapor in such solvent as benzene, toluene, ethyl ether or tetrahydrofuran, and the desired aluminoxane is recovered as a hydrocarbon solution containing the same.

(3) A method wherein an organoaluminum compound such as trialkylaluminum is allowed to react with an organotin oxide in a solvent such as decane, benzene or toluene.

The aluminoxane as illustrated above may contain small amounts of organometallic components. From the above-mentioned solution containing aluminoxane as recovered, the solvent or unaltered organoaluminum compound is removed by distillation, and the remaining aluminoxane may dissolved again in a solvent.

The organoaluminum compound used in preparing the above-mentioned solution of aluminoxane includes concretely trialkylaluminum such as trimethylaluminum, triethylaluminum, tripropylalminum, triisopropylaluminum, tri-n-butylaluminum, triisobutylaluminum, tri-sec-butylaluminum, tri-tert-butylaluminum, tripentylaluminum, trihexylaluminum, triOctylaluminum, tridecylaluminum, tricycloalkylaluminum such as tricyclohexylaluminum or tricyclooctylaluminum;

dialkylaluminum halide such as dimethylaluminum chloride, diethylaluminum chloride, diethylaluminum bromide or diisobutylaluminum chloride;

dialkylaluminum hydride such as diethylaluminum hydride or diisobutylaluminum hydride;

dialkylaluminum alkoxide such as dimethylaluminum methoxide or diethylaluminum ethoxide; and dialkylaluminum aryloxide such as diethylaluminum phenoxide.

Of these solvents as exemplified above, particularly preferred are trialkylaluminum.

Furthermore, there may also be used as the organoaluminum compound isoprenylaluminum represented by the general formula $$(i-C_4H_9)_xAl_y(C_5H_{10})_z \qquad [I]$$

wherein x, y and z are each a positive number, and $z \geq 2x$.

The organoaluminum compounds mentioned above may be used either singly or in combination.

Solvents used in the solutions of aluminoxane include aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclopentane; petroleum fractions such as gasoline, kerosene and gas oil; or haloganated hydrocarbons such as halides, particularly chloride and bromides, of the above-mentioned aromatic, aliphatic and alicyclic hydrocarbons. In addition thereto, there may also be used ethers such as ethyl ether and tetrahydrofuran. Of these solvents as exemplified above, particularly preferred are aromatic hydrocarbons.

The transition metal compound [C] of the group IVB of the periodic table containing a ligand having a cyclopentadienyl skeleton used in the present invention is represented by the formula $$ML_x \qquad [II]$$

wherein M is a transition metal of IVB group, L is a ligand coordinating to the transition metal, at least one of L is a ligand having a cyclopentadienyl skeleton, L other than the ligand having a cyclopentadienyl skeleton is a hydrocarbon group of 1-12 carbon atoms, an alkoxy group, an aryloxy group, halogen, trialkylsilyl group, $SO_3R$ (wherein R is a hydrocarbon group of 1 to 8 carbon atoms which may have a substituent such as halogen), or hydrogen, and x is a valence of the transition metal.

The ligands having a cyclopentadienyl skeleton include, for example, cyclopentadienyl, alkyl-substituted cyclopentadienyl groups such as methylcyclopentadienyl, dimethylcyclopentadienyl, trimethylcyclopentadienyl, tetramethylcyclopentadienyl, pentamethylcyclopentadienyl, ethylcyclopentadienyl, methylethylcyclopentadienyl, propylcyclopentadienyl, methylpropylcyclopentadienyl, butylcyclopentadienyl, methylbutylcyclopentadienyl, and hexylcyclopentadienyl, and an indenyl group, 4, 5, 6, 7-tetrahydroindenyl group and a fluorenyl group. These groups may be substituted by a halogen atom or trialkylsilyl group.

Of these ligands coordinating to the transition metal, the alkyl-substituted cyclopentadienyl groups are most preferred.

When the compound represented by the formula $ML_x$[II] contains two or more ligands having a cyclopentadienyl skeleton, at least two ligands having a cyclopentadienyl skeleton may be bonded together via an alkylene group such as ethylene and propylene, an isopropylidene group, a substituted alkylene group such as diphenylmethylene, a silylene group or a substituted silylene group such as dimethylsilylene, diphenylsilylene and methylphenylsilylene.

The ligand other than those having a cyclopentadienyl skeleton is a hydrocarbon group of 1-12 carbon atoms, an alkoxy group, an aryloxy group, halogen, trialkylsilyl group, $SO_3R$, or hydrogen.

The hydrocarbon group having 1-12 carbon atoms includes, for example, alkyl, cycloalkyl, aryl and aralkyl; the alkyl group includes methyl, ethyl, propyl, isopropyl, butyl and pentyl; the cycloalkyl group includes, for example, cyclopentyl and cyclohexyl; the aryl group includes, for example, phenyl and tolyl; and the aralkyl group includes, for example, benzyl and neophyl.

The alkoxy group includes, for example, methoxy, ethoxy and butoxy.

The aryloxy group includes, for example, phenoxy.

The hologen includes, for example, fluorine, chlorine, bromine and iodine.

The ligand represented by SO₃R includes, for example, p-toluenesulfonate, methanesulfonate and trifluoromethanesulfonate.

The transition metal compound [C] containing ligands having a cyclopentadienyl skeleton used in the present invention includes the transition metal having, for example, a valence of 4. The transition metal compound [C] may be represented more concretely by the formula [II']

$$R^1{}_a R^2{}_b R^3{}_c R^4{}_d M \quad [II']$$

wherein M is zirconium, titanium, or hafnium, $R^1$ is a group having a cyclopentadienyl skeleton, $R^2$, $R^3$ and $R^4$ are each a group having a cyclopentadienyl skeleton, an alkyl, cycloalkyl, aryl, aralkyl, alkoxy or aryloxy group, halogen, trialkylsilyl group, SO₃R or hydrogen, a is an integer of at least 1, and a+b+c+d=4.

In the transition metal compounds of the above-mentioned formula $R^1{}_a R^2{}_b R^3{}_c R^4{}_d M$ [II'], at least one of $R^2$, $R^3$ and $R^4$ having a cyclopentadienyl skeleton is preferred, that is, $R^1$ and $R^2$ are each a group having a cyclopentadienyl skeleton. These groups having a cyclopentadienyl skeleton may be bonded to each other via an alkylene group such as ethylene and propylene, a substituted alkylene group such as diphenylmethylene, an alkylidene group such as isopropylidene, a silylene group or a substituted silylene group such as dimethylsilylene, diphenylsilylene and methylphenylsilylene. Also, $R^3$ and $R^4$ may be each a group having a cyclopentadienyl skeleton, an alkyl, cycloalkyl, aryl, aralkyl, alkoxy or aryloxy group, halogen, trialkylsilyl group, SO₃R or hydrogen.

Listed below are typical representatives of the transition metal compounds [C] having a cyclopentadienyl skeleton, represented by the aforementioned formula ML$_x$ in which M is zirconium.

Bis(indenyl)zirconium dichloride,
Bis(indenyl)zirconium dibromide,
Bis(indenyl)zirconium bis(p-toluenesulfonate),
Bis(4,5,6,7-tetrahydroindenyl)zirconium dichloride,
Bis(fluorenyl)zirconium dichloride,
Ethylenebis(indenyl)zirconium dichloride,
Ethylenebis(indenyl)zirconium dibromide,
Ethylenebis(indenyl)dimethyl zirconium,
Ethylenebis(indenyl)diphenyl zirconium,
Ethylenebis(indenyl)methyl zirconium monochloride,
Ethylenebis(indenyl)zirconium bis(mehtanesulfonate),
Ethylenebis(indenyl)zirconium bis(p-toluenesulfonate),
Ethylenebis(indenyl)zirconium bis(trifluoromethanesulfonate),
Ethylenebis(4,5,6,7-tetrahydroindenyl)zirconium dichloride,
Isopropylidene(cyclopentadienyl-fluorenyl)zirconium dichloride,
Isopropylidene(cyclopentadienyl-methylcyclopentadienyl) zirconium dichloride,
Dimethylsilylenebis(cyclopentadienyl)zirconium dichloride,
Dimethylsilylenebis(methylcyclopentadienyl)zirconium dichloride,
Dimethylsilylenebis(dimethylcyclopentadienyl)zirconium dichloride,
Dimethylsilylenebis(trimethylcyclopentadienyl)zirconium dichloride,
Dimethylsilylenebis(indenyl)zirconium dichloride,
Dimethylsilylenebis(indenyl)zirconium bis(trifluoromethanesulfonate),
Dimethylsilylenebis(4,5,6,7-tetrahydroindenyl)zirconium dichloride,
Dimethylsilylene(cyclopentadienyl-fluorenyl)zirconium dichloride,
Diphenylsilylenebis(indenyl)zirconium dichloride,
Methylphenylsilylenebis(indenyl)zirconium dichloride,
Bis(cyclopentadienyl)zirconium dichloride,
Bis(cyclopentadienyl)zirconium dibromide,
Bis(cyclopentadienyl)methyl zirconium monochloride,
Bis(cyclopentadienyl)ethyl zirconium monochloride,
Bis(cyclopentadienyl)cyclohexyl zirconium monochloride,
Bis(cyclopentadienyl)phenyl zirconium monochloride,
Bis(cyclopentadienyl)benzyl zirconium monochloride,
Bis(cyclopentadienyl)zirconium monochloride monohydride,
Bis(cyclopentadienyl)methyl zirconium monohydride,
Bis(cyclopentadienyl)dimethyl zirconium,
Bis(cyclopentadienyl)diphenyl zirconium,
Bis(cyclopentadienyl)dibenzyl zirconium,
Bis(cyclopentadienyl)zirconium methoxy chloride,
Bis(cyclopentadienyl)zirconium ethoxy chloride,
Bis(cyclopentadienyl)zirconium bis(mehtanesulfonate),
Bis(cyclopentadienyl)zirconium bis(p-toluenesulfonate),
Bis(cyclopentadienyl)zirconium bis(trifluoromethanesulfonate),
Bis(methylcyclopentadienyl)zirconium dichloride,
Bis(dimethylcyclopentadienyl)zirconium dichloride,
Bis(dimethylcyclopentadienyl)zirconium ethoxy chloride,
Bis(dimethylcyclopentadienyl)zirconium bis(trifluoromethanesulfonate),
Bis(ethylcyclopentadienyl)zirconium dichloride,
Bis(methylethylcyclopentadienyl)zirconium dichloride,
Bis(propylcyclopentadienyl)zirconium dichloride,
Bis(methylpropylcyclopentadienyl)zirconium dichloride,
Bis(buthylcyclopentadienyl)zirconium dichloride,
Bis(methylbuthylcyclopentadienyl)zirconium dichloride,
Bis(methylbuthylcyclopentadienyl)zirconium bis(mehtanesulfonate),
Bis(trimethylcyclopentadienyl)zirconium dichloride,
Bis(tetramethylcyclopentadienyl)zirconium dichloride,
Bis(pentamethylcyclopentadienyl)zirconium dichloride,
Bis(hexylcyclopentadienyl)zirconium dichloride,
Bis(trimethylsilylcyclopentadienyl)zirconium dichloride In the above-mentioned transition metal compound, the di-substituted cyclopentadienyl groups include 1, 2- and 1,3- substituted groups, and the tri-substituted cyclopentadienyl groups include 1, 2, 3- and 1, 2, 4- substituted groups. Also the alkyl groups such as propyl and butyl include n-, i-, sec- and tert- isomers.

There may also be used transition metal compounds obtained by replacing the zirconium metal in the above-exemplified zirconium compounds with titanium metal or hafnium metal.

These transition metal compounds [C] may be used alone or in combination.

When the transition metal compounds [C] is used in combination, it is preferred that at least one member selected from the group consisting of compounds (i) and (ii) as mentioned below is combined with at least one member selected from the group consisting of compound (iii) and (iv) as mentioned below.

The compounds (i), (ii) (iii) and (iv) are explained below.

(i) Transition metal compound containing two ligands having a cyclopentadienyl skeleton, in which the ligands are bonded together via a substituted or unsubstituted alkylene group, a substituted or unsubstituted silylene group and the like (hereinafter referred to "bridge type transition metal compound").

(ii) Transition metal compound containing two ligands having a cyclopentadienyl skeleton, in which the ligands are not bonded each other (hereinafter referred to "non-bridge type transition metal compound"), and the ligands have 2 to 5 substituents.

(iii) Transition metal compound containing a ligand having a cyclopentadienyl skeleton, which is the non-bridge type transition metal compound, wherein the ligand has no substituent.

(iv) Transition metal compound containing a ligand having a cyclopentadienyl skeleton, which is the non-bridge type transition metal compound, wherein the ligand has one substituent.

In the above combinations, it is most preferred that (ii) non-bridge type transition metal compound containing ligands having a cyclopentadienyl skeleton, wherein the ligands have, particularly, 2 to 3 substituents, is combined with (iv) non-bridge type transition metal compound containing a ligand having a cyclopentadienyl skeleton, wherein the ligand has one substituent.

When two kinds of compounds [C] are mixed, one compound is preferably used in an amount of from 5 to 95 mol%, more preferably 10 to 90 mol%, and most preferably 20 to 80 mol%. When three or more kinds of compounds [C] are mixed, the mixing ratio is not particularly limited, but one kind of them is used preferably in an amount of not more than 95 mol% and not less than 5 mol%.

When at least two compounds [C] are used as an olefin polymerization catalyst, an olefin polymer having a broad molecular weight distribution and an excellent moldability can be obtained.

The organoaluminum compound [D] is illustrated below in detail.

ORGANOALUMINUM COMPOUND [D]

The organoaluminum compound [D] (hereinafter referred to as "compound [D]") used in the present invention is represented by the formula:

$$R^5{}_nAlX_{3-n} \qquad [III]$$

wherein $R^5$ is hydrocarbon of 1-12 carbon atoms, X is halogen or hydrogen, and n is 1-3.

In the above-mentioned formula, $R^5$ is hydrocarbon of 1-12 carbon atoms, for example, alkyl, cycloalkyl or aryl, including concretely methyl, ethyl, n-propyl, isopropyl, isobutyl, pentyl, hexyl, octyl, cyclopentyl, cyclohexyl, phenyl, tolyl, etc.

The organoaluminum compounds of the formula $R^5{}_nAlX_{3-n}$ include, in concrete, such compounds as mentioned below.

Trialkylaluminum such as trimethylaluminum, triethylaluminum, triisopropylaluminum, triisobutylaluminum, trioctylaluminum, tri-2-ethylhexylaluminum, etc;

alkenylaluminum such as isoprenylaluminum, etc;

dialkylaluminum halides such as dimethylaluminum chloride, diethylaluminum chloride, diisopropylaluminum chloride, diisobutylaluminum chloride, dimethylaluminum bromide, etc;

alkylaluminum sesquihalides such as methylaluminum sesquichloride, ethylaluminum sesquichloride, isopropylaluminum sesquichloride, butylaluminum sesquichloride, ethylaluminum sesquibromide, etc;

alkylaluminum dihalides such as methylaluminum dichloride, ethylaluminum dichloride, isopropylaluminum dichloride, ethylaluminum dibromide, etc, and alkylaluminum hydride such as diethylaluminum hydride and diisobutylaluminum hydride.

As the organoaluminum compounds [D], there may also be used a compound represented by the following formula:

$$R^5{}_nAlY_{n-n} \qquad [IV]$$

wherein $R^5$ is as defined above, Y is $-OR^6$, $-OSiR^7{}_3$, $-OAlR^8{}_2$, $-NR^9{}_2$, $-SiR^{10}{}_3$, or $-N(R^{11})AlR^{12}{}_2$, n is 1-2 and $R^6$, $R^7$, $R^8$ and $R^{12}$ are each methyl, ethyl, isopropyl, isobutyl, cyclohexyl, phenyl, etc;

$R^9$ is hydrogen, methyl, ethyl, isopropyl, phenyl, trimethylsilyl, etc; and $R^{10}$ and $R^{11}$ are each methyl, ethyl, etc.

The organoaluminum compounds of the formula $R^5{}_nAlY_{3-n}$ [IV] include, in concrete, such compounds as mentioned below.

(i) Compounds of the formula $R^5{}_nAl(OR^6)_{3-n}$ such as dimethylaluminum methoxide, diethylaluminum ethoxide, diisobutylaluminum methoxide, etc;

(ii) Compounds of the formula $R^5{}_nAl(OSir^7{}_3)_{3-n}$ such as $(C_2H_5)_2AlOSi(CH_3)_3$, $(iso\text{-}C_4H_9)_2AlOSi(CH_3)_3$, $(iso\text{-}C_4H_9)_2AlOSi(C_2H_5)_3$, etc;

(iii) Compounds of the formula $R^5{}_nAl(OAlR^8{}_2)_{3-n}$ such as $(C_2H_5)_2AlOAl(C_2H_5)_2$, $(iso\text{-}C_4H_9)_2AlOAl(iso\text{-}C_4H_9)_2$, etc;

(iv) Compounds of the formula $R^5{}_nAl(NR^9{}_2)_{3-n}$ such as $(CH_3)_2AlN(C_2H_5)_2$, $(C_2H_5)_2AlNHCH_3$, $(CH_3)_2AlNH(C_2H_5)$; $(C_2H_5)_2AlN(Si(CH_3)_3)_2$, $(iso\text{-}C_4H_9)_2AlN(Si(CH_3)_3)_2$, etc;

(v) Compounds of the formula $R^5{}_nAl(SiR^{10}{}_3)_{3-n}$ such as $(iso\text{-}C_4H_9)_2AlSi(CH_3)_3$, etc; and (vi) Compounds of the formula $R^5{}_nAl(N(R^{11})AlR^{12}{}_2)_{3-n}$ such as $(C_2H_5)_2AlN(CH_3)Al(C_2H_5)_2$, $(iso\text{-}C_4H_9)_2AlN(C_2H_5)Al(iso\text{-}C_4H_9)_2$, etc.

Of the organoaluminum compounds as exemplified above formulae [III] and [IV], preferred are those of the formula $R^5{}_3Al$, $R^5{}_nAl(OR^6)_{3-n}$ or $R^5{}_nAl(OAlR^8{}_2)_{3-n}$, and particularly preferred is that in which $R^5$ is isoalkyl and n is 2.

These organoaluminum compounds may be used alone or in combination.

The olefin polymerization solid catalyst can be prepared by mixing the above-mentioned particulate carrier [A], the organoaluminum oxy-compound [B], the transition metal compound [C] of group IVB containing a ligand having a cyclopentadienyl skeleton, and if necessary, the organoaluminum compound [D] with or without an inactive hydrocarbon solvent.

As the inert hydrocarbon solvent, there may be mentioned an aliphatic hydrocarbon, such as propane, butane, pentane, hexane, heptane, octane, decane, dodecane and kerosene;

an alicycloic hydrocarbon, such as cyclopentane, cyclohexane and methylcyclohexane;

an aromatic hydrocarbon, such as benzene, toluene and xylene;

a halogenated hydrocarbon, such as ethylene chloride, chlorobenzene and dichloromethane; and a mixture thereof.

Though the mixing of these compounds [A]-[D] may be conducted in an arbitrarily selected order, the mixing and contacting is preferably conducted in the order of:

the compound [A] and the compound [B] are mixed and contacted, followed by mixing and contacting the compound [C];

the compound [A] and the compound [B] are mixed and contacted, and compound [C] is mixed and contacted, followed by mixing and contacting the compound [D];

the compound [A] and the compound [B] are mixed and contacted, and compound [D] is mixed and contacted, followed by mixing and contacting the compound [C]; or the compound [A] and the compound [B] are mixed and contacted, followed by simultaneously mixing and contacting the compound [C] and compound [D], the compound [A] and the compound [B] are mixed and contacted, followed by mixing and contacting the pre-mixture of the compound [C] and compound [D].

In the present invention, two or more kinds of the compounds [C] may be used. When the two or more kinds of the compounds [C] are used, these are preferably pre-mixed, and further, the mixing and contacting are conducted preferably under stirring.

The temperature at mixing and contacting the compounds [A] to [D] is in the range of from $-100$ to $200°$ C., preferably $-70$ to $100°$ C. The order of the mixing the compound [A] and the compound [B] is arbitrarily selected, but it is preferred that the further components are gradually added for 5 minutes to 2 hours. The compound [A] and the compound [B] are mixed and contacted under the conditions mentioned above, and further mixing and contacting at $-30$ to $200°$ C., preferably 0 to $120°$ C., for 10 minutes to 10 hours, preferably 1 to 6 hours, followed by mixing and contacting the compound [C], if necessary, mixing and contacting the compound [D].

When the compounds [A], [B] and [C], and if necessary the compound [D] are mixed and contacted, the molecular ratio ($H_2O/Al$) of the compound [A] to [B] in terms of $H_2O$ of compound [A] to Al atom of the compound [B] is 0.02 to 0 8, preferably 0.05 to 0.6.

The compound [C] is used usually in an amount of $10^{-5}$ to $5\times10^{-3}$ mol, preferably $5\times10^{-5}$ to $10^{-3}$ mol based on 1g of the compound [A], and the concentration thereof is $10^{-4}$ to $2\times10^{-2}$ mol/l, preferably $2\times10^{-4}$ to $10^{-2}$ mol/l.

The atomic ratio [Al/(transition metal)] of the aluminum in the compound [B] to the transition metal in the compound [C] is usually 10 to 3,000, preferably 20 to 2,000.

The atomic ratio ($Al_D/Al_B$) of the aluminum atoms ($Al_D$) in the compound [D] optionally used to the aluminum atoms ($Al_B$) in the compound [B] is usually 0.02 to 3, preferably 0.05 to 1.5. The compound [A], [B] and [C], and if necessary the compound [D] are mixed at a temperature of usually $-20$ to $150°$ C., preferably 0 to $120°$ C., with a contact time of 1 to 300 minutes, preferably 5 to 200 minutes. Also, when the mixing and contacting, the mixing temperature may be appropriately changed.

In the solid catalyst for olefin polymerization of the present invention obtained as described above, the transition metal is supported in an amount of $5\times10^{-6}$ to $10^{-3}$g atom, preferably $10^{-5}$ to $3\times10^{-4}$g atom, and aluminum is supported in an amount of $10^{-3}$ to $10^{-1}$g atom, preferably $2\times10^{-3}$ to $5\times10^{-2}$g atom, all the amounts being based on 1g of the compound [A].

The prepolymerized catalyst for olefin polymerization of the invention may also be prepared by mixing the compound [A], compound [B], the compound [C] and if necessary the compound [D], introducing olefin to the resulting mixture, and carrying out prepolymerization.

The order of mixing the compounds [A], [B] and [C], and if necessary compound [D] is the same as in olefin polymerization solid catalyst, in this instance, the compound [D] is further added during the polymerization. Further, in this prepolymerization, the same inactive solvent as used in the preparation of the olefin polymerization solid catalyst can be used.

In the prepolymerization, the compound [C] is used in an amount of about $10^{-5}$ to $2\times10^{-2}$ mol/l, preferably $5\times10^{-5}$ to $10^{-2}$ mol/l. The prepolymerization is carried out at a temperature of $-20$ to $80°$ C., preferably 0 to $50°$ C., with a time of 0.5 to 100 hours, preferably about 1 to 50 hours.

Though olefin used in the prepolymerization is selected from the olefin used in the polymerization, ethylene or a mixture of ethylene and α-olefin is preferred.

In the prepolymerized solid catalyst for olefin polymerization of the present invention obtained as described above, the transition metal is supported in an amount of $5\times10^{-6}$ to $10^{-3}$g atom, preferably $10^{-5}$ to $3\times10^{-4}$g atom, and aluminum is supported in an amount of about $10^{-3}$ to $10^{-1}$g atom, preferably $2\times10^{-3}$ to $5\times10^{-2}$g atom, all the amounts being based on 1g of the compound [A].

Furthermore, an amount of prepolymerized polyolefin produced in the prepolymerization is, based on 1g of the compound [A], from about 0.1 to 500g, preferably 0.3 to 300g, particularly preferably 1 to 100g.

The olefin polymerization catalyst of the present invention may further contain useful compounds in addition to the above-mentioned compounds.

The olefin is polymerized in the presence of the catalyst for olefin polymerization of the invention. The transition metal compounds [C] is desirably used in an amount (per liter of the polymerization volume) of usually $10^{-8}$ to $10^{-3}$g atom, preferably $10^{-7}$ to $10^{-4}$g atom in terms of the transition metal. In the polymerization, an organoaluminum compound and an aluminoxane may be used if necessary. Examples of the organoaluminum compound used in the polymerization include compounds similar to the organoaluminum compound [D] described above. The organoaluminum compound is used in an amount of 0 to 500 moles, preferably 5 to 200 moles based on 1g atom of the transition metal.

The olefins which can be polymerized with such the catalyst for olefin polymerization include ethylene and olefins each having 3 to 20 carbon atoms, for example, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, cyclopentene, cycloheptene, norbornene, 5-methyl-2-norbornene, tetracyclododecene, 2-methyl-1,4,5,8-dimethano1,2,3,4,4a,5,8-,8a-octahydronaphthalene. In addition, styrene, vinylcyclohexane and dienes may also be employed.

The polymerization of the present invention can be practiced either in a liquid phase polymerization such as suspension polymerization, or a gas phase polymerization.

In the process for liquid phase polymerization, the same inactive hydrocarbon solvent as employed in the catalyst preparation can be used, and the olefin itself can also be used as a solvent.

The olefin polymerization is carried out in the presence of the catalyst as described above for olefin polymerization at a temperature of usually −50 to 150° C., preferably 0 to 100° C., at a pressure of usually a normal pressure to 100kg/cm$^2$, preferably a normal pressure to 50kg/cm$^2$. The polymerization reaction can be carried out either batch-wise, semicontinuously or continuously. Moreover, the polymerization may also be carried out in two or more steps having different reaction conditions from each other. The molecular weight of the produced polyolefin can be adjusted either by introducing hydrogen in the polymerization system, or by changing the polymerization temperature.

The olefin polymers obtained by means of the olefin polymerization catalysts of the present invention have MFR, as measured according to ASTM D1238-65T at 190° C. under a load of 2.16 kg, of usually 0.001–100 g/10 min.

Further, the melt tension (MT) and MFR of the olefin polymers of the invention satisfy the relation represented usually by the following formula $$\log Mt \geq -0.66 \log MFR + 0.5$$

The ethylene polymers prepared according to the present invention in the manner as mentioned above are excellent in melt tension and favorable in moldability.

The melt tension is determined by measuring a stress of a molten polymer at the time when it is stretched at a prescribed speed. That is, the resulting polymer particles or pulverized products thereof are dissolved in decane, and the solution is poured in a methanol/acetone (1/1) solution in an amount of more than five times that of the decane to separate a polymer which is then used as a test sample. Using the test sample, the measurement was conducted by means of a MT measuring device manufactured and sold by Toyo Seiki Seisakusho K. K. under the conditions of a resin temperature of 190° C., extrusion speed of 10 mm/min, take-up speed of 10–20 m/min, nozzle diameter of 2.09 mm$\phi$ and nozzle length of 8 mm. At the time of measuring the melt tension, the ethylene polymer was incorporated previously with 0.1 % by weight of 2,6-di-t-butylparacresol as a crosslinking stabilizer.

EFFECT OF THE INVENTION

When the olefin polymerization catalysts of the present invention are used in the preparation of olefin polymers, there are obtained olefin polymers excellent in melt tension and there can be prepared spherical olefin polymers excellent in particle characteristics at high polymerization activity.

Furthermore, when catalysts of the invention comprising at least two kinds of transition metal compounds of metal belonging to the group IV of the periodic table and containing a ligand having a cyclopentadienyl skeleton are used likewise, there can be obtained olefin polymers having such characteristics as mentioned above and broad in molecular weight distribution, and excellent in melt tension as well as in moldability.

According to the olefin polymerization process of the present invention, there can be prepared such olefin polymers having excellent characteristics as mentioned above.

The olefin polymerization catalysts and olefin polymerization processes of the present invention are illustrated below in more detail with reference to examples, but it should be construed that the invention is in no way limited to those examples.

EXAMPLE 1

Preparation of water adsorbed carrier

A quartz tube of 45 mm in inside diameter placed in an electric furnace was charged with 150 g of silica (F-948, a product of Fuji Devison Co.), and the silica was dried under a nitrogen stream at 200° C. for 4 hours and then at 700° C.

Subsequently, a 500 ml egg-plant type flask was charged with 30 g of the dried silica obtained above, 1.8 ml of water was added and stirred with revolving for 1 hour. In this manner, there was obtained the water adsorbed silica.

The water adsorbed silica weighed 20 g was dried under a nitrogen stream at 200° C. for 4 hours, whereby a loss in weight of 1.14 g was observed. Accordingly, the amount of water of the water adsorbed silica amounts to 5.7 % by weight.

Preparation of catalyst component (A-1)

A nitrogen purged 400 ml glass flask was charged with 85 ml of toluene and 65.2 ml of an organoaluminum oxy compound (methylaluminoxane of Schelling Co. was dried and then dissolved again in toluene. Al concentration: 1.15 gram-atom/1), and the temperature of the system was lowered with stirring to 0° C. To this flask was added in a nitrogen atmosphere over a period of 30 minutes 9.0 g of the water adsorbed silica obtained above. Subsequently, reaction was carried out at 20–25° C. for 1 hour and at 80° C. for 3 hours. In this manner, there was obtained the catalyst component (A-1).

Preparation of solid catalyst (C-1)

To a nitrogen purged 400 ml glass flask charged with 150 ml of hexane were added with stirring 15 mg-atoms in terms of Al atom of the (A-1) obtained above and 0.06 mmols in terms of Zr atom of bis(cyclopentadienyl)zirconium dichloride, and the mixture was stirred at 30° C. for 2 hours. As the result of this operation, there was obtained the solid catalyst (C-1) containing, based on 1 g of silica, 0.033 mg atom of Zr and 8.3 mg atom of Al.

Ethylene/1-butene copolymerization

In a thoroughly nitrogen-purged 2-liter stainless steel autoclave was placed 150 g of sodium chloride (a special grade of Wako Junyaku K. K.) followed by vacuum drying at 90° C. for 1 hour. Thereafter, a mixed gas comprising 96.2 mol% of ethylene and 3.8 mol% of 1-butene was introduced into the autoclave to reduce the pressure inside the system to ordinary pressure and the temperature inside the system was decreased to 70° C. Subsequently, the autoclave was charged with 0.5 mmols of triisobutylaluminum and 0.015 mmols in terms of Zr atom of the solid catalyst (C-1) obtained above.

Into the autoclave was introduced the above-mentioned mixed gas to carry out polymerization for 1 hour at a total pressure of 8 kg/cm$^2$-G and 80° C.

After the completion of the polymerization, unaltered sodium chloride was removed by water-washing, and the remaining polymer was washed with methanol, followed by vacuum drying at 80° C. overnight. There was obtained 63.7 g of the copolymer.

Physical properties of the thus obtained copolymer were measured. Results obtained are shown in Table 1.

EXAMPLE 2

Preparation of water adsorbed carrier

The same procedure as in the preparation of water adsorbed carrier of Example 1 was repeated to obtain a water adsorbed silica, except that the amount of water added to 30 g of the dried silica was changed from 1.8 ml to 0.45 ml. In this case, the amount of the adsorbed water was 1.48 % by weight.

Preparation of catalyst component (A-2)

A nitrogen purged 400 ml glass flask was charged with 85 ml of toluene and 65.2 ml of an organoaluminum oxy compound (methylaluminoxane of Schelling Co. was dried and then dissolved again in toluene, Al concentration: 1.15 gram-atom/l), and the temperature of the system was decreased with stirring to 0° C. To the flask was added in a nitrogen atmosphere 9.0 g of the water adsorbed silica obtained above over a period of 30 minutes. Subsequently, reaction was carried out at 20–25° C. for 1 hour and at 80° C. for 3 hours. A supernatant of the reaction mixture was then removed by decantation and the remaining solid portion was rinsed and charged with 85 ml of toluene. In this manner there was obtained the catalyst component (A-2).

Preparation of solid catalyst (C-2)

To a nitrogen purged 400 ml glass flask charged with 150 ml of hexane, were added with stirring 15 mg-atoms in terms of Al atom of the (A-2) obtained above and 0.06 mmol in terms of Zr atom of bis(cyclopentadienyl)zirconium dichloride, followed by stirring at 30° C. for 2 hours. As the result of this operation, there was obtained the solid catalyst (C-2) containing, based on 1 g of silica, 0.033 mg atom of Zr. and 6.6 mg atom of Al.

Ethylene/1-butene copolymerization

The same procedure of ethylene/1-butene copolymerization as in Example 1 was repeated except that in place of the solid catalyst (C-1), there was used the solid catalyst (C-2) obtained above. The polymer obtained thereby amounted to 59.9 g.

Physical properties of the thus obtained polymer were measured. Results obtained are shown in Table 1.

COMPARATIVE EXAMPLE 1

Preparation of solid catalyst (C-3)

A nitrogen purged 500 ml egg plant type flask was charged with 10 g of the dried silica obtained above (amount of adsorbed water: 0% by weight) and 145 ml of an organoaluminum oxy compound (methylaluminoxane of Schelling Co. was dried and then dissolved again in toluene, Al concentration: 1.15 gram-atom/l), and held at room temperature for about 1 hour under reduced pressure until no liquid was observed. In this manner, an aluminoxane supported silica was obtained.

Subsequently, to a nitrogen purged 400 ml glass flask charged with 100 ml of hexane, were added with stirring 40 mg-atom in terms of Al atom of the aluminoxane supported silica obtained above and 0.08 mmol in terms of Zr atom of bis(cyclopentadienyl) zirconium dichloride, and the mixture was vacuum dried with stirring at room temperature for 2 hours. As the result of this operation, there was obtained the solid catalyst (C-3) containing, based on 1 g of silica, 0.033 mg atom of Zr and 16.6 mg atom of Al.

Ethylene/1-butene copolymerization

The same procedure of ethylene/1-butene copolymerization as in Example 1 was repeated except that in place of the catalyst (C-1), there was used 0.015 mmol in terms of Zr atom of the solid catalyst (C-3) obtained above. The copolymer thus obtained amounted to 52.2 g.

Physical properties of the thus obtained copolymer were measured. Results obtained are shown in Table 1.

EXAMPLE 3

A solid catalyst (C-4) was obtained by repeating Example 1 except that in place of the bis(cyclopentadienyl) zirconium dichloride used as the transition metal compound, there was used ethylenebis (indenyl)zirconium dichloride.

Ethylene/1 butene copolymerization

The same procedure of ethylene/1-butene copolymerization as in Example 1 was carried out except that in place of 0.015 mmol of the solid catalyst (C-1) there was used 0.003 mmol in terms of Zr atom of the solid catalyst (C-4), and 50 ml of hydrogen was added to the polymerization system. The copolymer thus obtained amounted to 25.3 g.

Physical properties of the thus obtained copolymer were measured. Results obtained are shown in Table 1.

EXAMPLE 4

A nitrogen purged 1-liter glass polymerizer was charged with 1 liter of purified n-decane, and the temperature inside the polymerizer was elevated up to 70° C. while passing therethrough ethylene at a rate of 250 l/hr and hydrogen at a rate of 2 l/hr. Subsequently, 0.02 mmol in terms of Zr atom of the solid catalyst (C-4) obtained in Example 3 was added to the reaction system, and the system was maintained at 75° C. to carry out suspension polymerization of ethylene at ordinary pressure for 2 hours. The polymer thus obtained amounted to 24.7 g.

Physical properties of the thus obtained polymer were measured. Results obtained are shown in Table 1.

EXAMPLE 5

A solid catalyst (C-5) was obtained by repeating Example 1 except that there were used a water adsorbed silica having 5.71% by weight of adsorbed water and ethylenebis(indenyl) zirconium dichloride as the transition metal compound.

Subsequently, suspension polymerization of ethylene at ordinary pressure was carried out in the same manner as in Example 4 except that in place of the solid catalyst (C-4), there was used the solid catalyst (C-5) obtained above, and the flow rate of hydrogen was changed from 2 l/hr to 0.5 l/hr. The polymer obtained amounted to 45.7 g.

Physical properties of the thus obtained polymer were measured. Results obtained are shown in Table 1.

EXAMPLES 6 AND 7

Suspension polymerization of ethylene at ordinary pressure was carried out using the solid catalyst (C-5) obtained in Example 5 and varying the flow rate of hydrogen as shown in Table 1. The polymers obtained amounted to 50.7 g and 40.9 g, respectively,.

Physical properties of the thus obtained polymers were measured. Results obtained are shown in Table 1.

EXAMPLE 8

A solid catalyst (C-6) was obtained by repeating Example 1 except that there were used a water adsorbed silica having 1.46 % by weight of adsorbed water, and bis(trimethylsilylpentadienyl)zirconium dichloride as the transition metal compound.

Subsequently, suspension polymerization of ethylene at ordinary pressure was carried out in the same manner as in Example 4 except that there was used the solid catalyst (C-6) obtained above, and the flow rate of hydrogen was changed from 2 l/hr to 0.15 l/hr. The polymer obtained amounted to 11.0 g.

Physical properties of the thus obtained polymer were measured. Results obtained are shown in Table 1.

Table 2 shows the composition of the catalysts used in the foregoing examples and comparative example.

Figure 1:
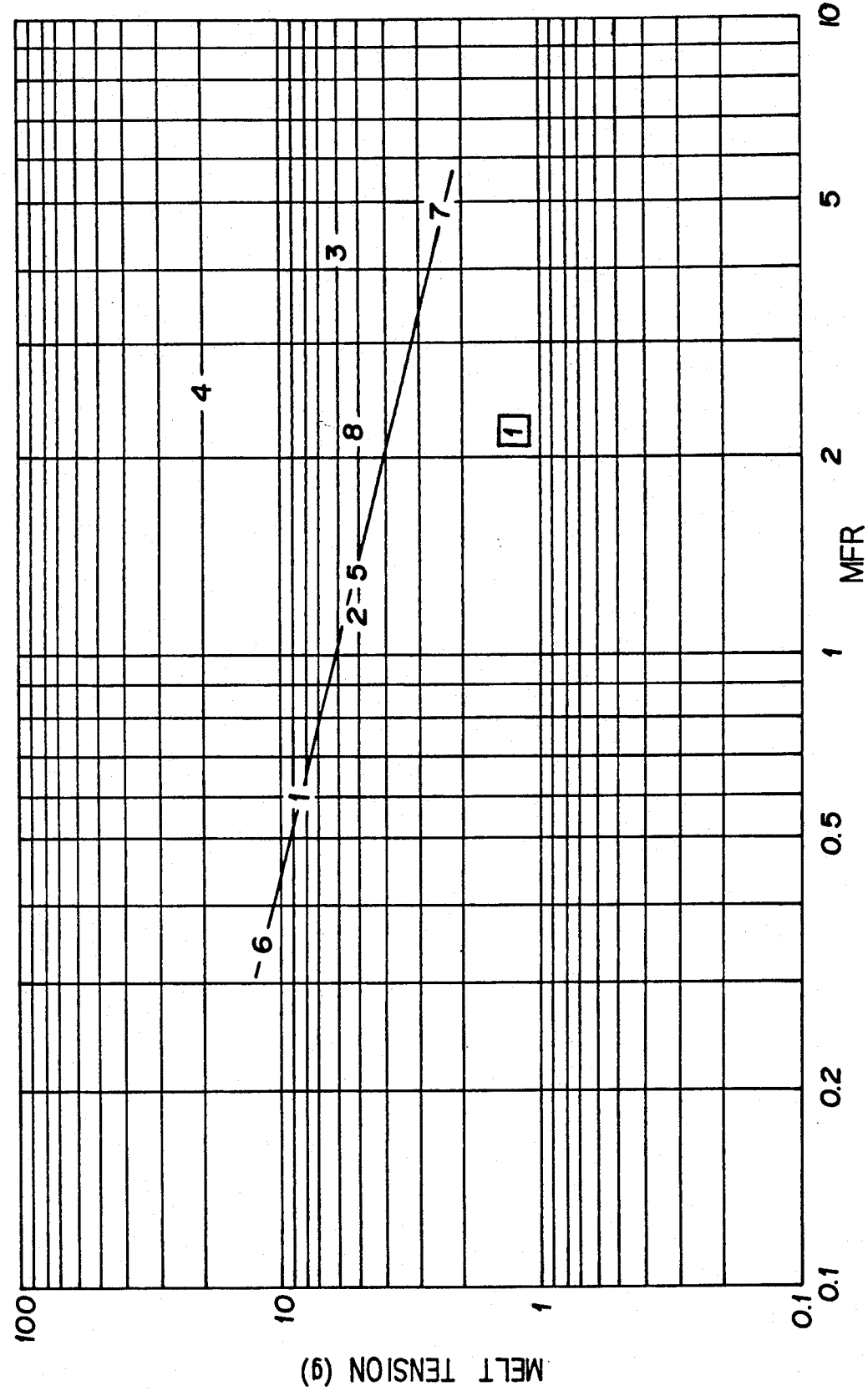
FIG. 1 is a graph showing the relationship between MFR and melt tension (MT) of the polymers obtained in Examples 1-8 and Comparative Example 1.

The relationship between MFR and melt tension (MT) of the polymers obtained in Examples 1–8 and Comparative Example 1 were shown in FIG. 1. The melt tension of polymers obtained by means of the same catalyst varies relative to MFR in the manner of straight line as shown in FIG. 1.

As can be seen from FIG. 1, it is understood that the melt tension of every polymer obtained in the examples is markedly higher than that of the polymer of the comparative example.

Preparation of water adsorbed carrier

A quarts tube of 45 mm in inside diameter placed in an electric furnace was charged with 100 g of silica (F-948, a product of Fuji Devison Co.), and the silica was dried under a nitrogen stream at 200° C. for 4 hours and then at 700° C. for 7 hours.

Subsequently, a 500 ml egg plant type flask was charged with 50 g of the dried silica obtained above, 0.9 ml of water was added and stirred with revolving for 1 hour In this manner, there was obtained a water adsorbed silica. The water adsorbed silica weighed 20 g was dried under a nitrogen stream at 200° C. for 4 hours, whereby a loss in weight of 0.59 g was observed.

Accordingly, the amount of water contained in the water adsorbed silica becomes 2.95% by weight.

Preparation of catalyst component (A-3)

A nitrogen purged 400 ml glass flask was charged with 85 ml of toluene and 65.2 ml of an organoalumi-

TABLE 1

| | | Polymerization conditions | | | | Result of polymerization | | | |
|---|---|---|---|---|---|---|---|---|---|
| | Type of polymerization | Amount of TIBA added (mmol) | Amount of C-n added (mmol-Zr) | Amount of 1-butene added (mol %) | Amount of hydrogen added (Nl/hr) | Yield (g) | Density (g/cm$^3$) | MFR (g/10 min) | MT[1] (g) |
| Ex. 1 | Vapor phase copolymerization under pressure[2] | 0.5 | C-1  0.015 | 3.6 | 0 | 63.7 | 0.925 | 0.59 | 8.3 |
| Ex. 2 | Same as the above | 0.5 | C-2  0.015 | 3.6 | 0 | 59.9 | 0.923 | 1.22 | 5.0 |
| Comp. Ex. 1 | Same as the above | 0.5 | C-3  0.015 | 3.6 | 0 | 52.2 | 0.922 | 2.10 | 1.3 |
| Ex. 3 | Same as the above | 0.5 | C-4  0.003 | 3.6 | 50[3] | 25.3 | 0.924 | 4.13 | 6.0 |
| Ex. 4 | Suspension polymerization at ordinary pressure[4] | 0 | C-4  0.02 | — | 2 | 24.7 | — | 2.61 | 20.0 |
| Ex. 5 | Same as the above | 0.5 | C-5  0.02 | — | 0.5 | 45.7 | — | 1.38 | 5.0 |
| Ex. 6 | Same as the above | 0.5 | C-5  0.02 | — | 0.25 | 50.7 | — | 0.34 | 12.5 |
| Ex. 7 | Same as the above | 0.5 | C-5  0.02 | — | 0.75 | 40.9 | — | 4.83 | 2.3 |
| Ex. 8 | Same as the above | 0.5 | C-6  0.02 | — | 0.15 | 11.0 | — | 2.10 | 5.2 |

[1] Melt tension
[2] Ethylene/1-butene copolymerization, total pressure 8 kg/cm$^2$-G, 80° C., 1 hour
[3] Unit:ml
[4] Homopolymerization of ethylene, circulation method at ordinary pressure, n-decane solvent, 75° C., 2 hours

TABLE 2

| | Amount of adsorbed water in silica weight % | Catalyst component (C-n) | | |
|---|---|---|---|---|
| | | C-n | Transition metal compound component | Amount of MAO[1] supported in C-n (mg-atom/g-silica) | Amount of Zr supported in C-n (mmol/g-silica) |
| Ex. 1 | 5.70 | C-1 | Cp$_2$ZrCl$_2$[2] | 8.3 | 0.033 |
| Ex. 2 | 1.48 | C-2 | Cp$_2$ZrCl$_2$[2] | 6.6 | 0.033 |
| Comp. Ex. 1 | 0 | C-3 | Cp$_2$ZrCl$_2$[2] | 16.6 | 0.033 |
| Ex. 3 | 5.81 | C-4 | Et(Ind)$_2$ZrCl$_2$[3] | 8.3 | 0.033 |
| Ex. 5 | 5.71 | C-5 | (1,3Me$_2$Cp)$_2$ZrCl$_2$[4] | 8.3 | 0.033 |
| Ex. 8 | 1.46 | C-6 | (Me$_3$SiCp)$_2$Cl[5] | 6.9 | 0.033 |

[1] Methylaluminooxane
[2] Bis(cyclopentadienyl)zirconium dichloride
[3] Ethylenebis(indenyl)zirconium dichloride
[4] Bis(1,3-dimethylcyclopentadienyl)zirconium dichloride
[5] Bis(trimethylsilylcyclopentadienyl)zirconium dichloride Co. was dried and then dissolved again in toluene, Al concentration: 1.15 gram-atom/1), and the temperature of the system was decreased with stirring to 0° C. To the flask was added in a nitrogen atmosphere 9.0 g of the water adsorbed silica obtained above over a period of 30 minutes. Subsequently, reaction was carried out at 20–25° C. for 1 hour and at 80° C. for 3 hours. In this manner, there was obtained the catalyst component (A-3).

Preparation of prepolymerization catalyst (C-7)

To a nitrogen purged 400 ml glass flask charged with 153 ml of hexane were added with stirring 15 mg-atoms in terms of Al atom of the above-mentioned (A-3), 0.3 mmol in terms of Zr atom of bis(cyclopentadienyl)zirconium dichloride and 1.5 mmol of triisobutylaluminum, and ethylene gas (ordinary pressure) was continuously introduced into the flask to carry out prepolymerization at 30° C. for 2 hours. As the result of this operation, there was obtained the prepolymerization catalyst (C-7) containing, based on 1 g of silica, 0.17 mg atom of zirconium, 8.3 mg atom of aluminum and 7.5 g of polyethylene.

Polymerization

To a nitrogen purged 2-liter stainless steel autoclave was fed 150 g of sodium chloride (special grade of Wako Junyaku K. K.) followed by vacuum drying at 90° C. for 1 hour. Thereafter, a mixed gas comprising 94.3 mol% of ethylene and 5.7 mol% of 1-butene was introduced into the autoclave to bring the pressure inside the autoclave to ordinary pressure, and the temperature of the system was lowered to 70° C.

Subsequently, the autoclave was charged with 0.5 mmol of triisobutylaluminum and 0.01 mmol in terms of Zr atom of the prepolymerization catalyst (C-7).

Thereafter, the above-mentioned mixed gas was introduced into the autoclave to carry out polymerization at a total pressure of 8 kg/cm$^2$-G and 80° C. for 1 hour. After the completion of the polymerization, the reaction mixture was washed with water to remove the sodium chloride therefrom, and the remaining polymer was washed with methanol followed by vacuum drying at 80° C. overnight. The polymer obtained amounted to 68.4 g.

Physical properties of the thus-obtained polymer were measured. Results obtained are shown in Table 3.

COMPARATIVE EXAMPLE 2

Preparation of prepolymerization catalyst (C-8)

The prepolymerization catalyst (C-8) containing, based on 1 g of silica, 0.12 mg atom of zirconium, 5.9 mg atom of aluminum and 7.5 g of polyethylene was obtained by the same procedure as described in the preparation of (A-3) of Example 9 except that in place of the water adsorbed silica, there was used the dried silica (amount of adsorbed water: 0% by weight).

Polymerization

The same ethylene/1-butene copolymerization as in Example 9 was carried out except that in place of the prepolymerization catalyst (C-7) used in Example 9, there was used 0.02mg atom in terms of zirconium atom of the prepolymerization catalyst (C-8). The polymer obtained amounted 71.5 g.

Physical properties of the thus-obtained polymer were measured. Results obtained are shown in Table 3.

EXAMPLE 10

A prepolymerization catalyst (C-9) was prepared by the same procedure as in Example 9 except that there were used the water adsorbed silica having 2.80 % by weight of water and bis(methylcyclopentadienyl)zirconium dichloride as the transition metal compound component The same ethylene/1-butene copolymerization as in Example 9 was carried out. The copolymer obtained amounted to 84.4 g.

Physical properties of the thus-obtained copolymer were measured. Results obtained are shown in Table 3.

EXAMPLE 11

A prepolymerization catalyst (C-10) was obtained by the same procedure as in Example 9 except that there were used the water adsorbed silica having 1.51 % by weight of adsorbed water obtained by using the silica dried at 200° C. for 4 hours and bis(1,3-dimethylcyclopentadienyl)zirconium dichloride as the transition metal compound component. Subsequently, the same ethylene/1-butene copolymerization as in Example 9 except that 50 ml of hydrogen was allowed to co-exist with ethylene and 1-butene. The copolymer obtained amounted 39.3 g.

Physical properties of the thus-obtained copolymer were measured. Results obtained are shown in Table 3.

EXAMPLES 12 AND 13

Copolymerization of ethylene and 1-butene was carried out using the prepolymerization catalyst (C-10) obtained in Example 11 and varying the amount of hydrogen to be added as shown in Table 3. The copolymers obtained amounted to 50.5 g and 32.7 g, respectively.

EXAMPLE 14

A prepolymerization catalyst (C-11) was prepared by the same procedure as in Example 9 except that there were used the water adsorbed silica having 5.72 % by weight of adsorbed water and ethylenenbis(indenyl)zirconium dichloride as the transition metal compound component. The copolymer obtained amounted to 40.6 g.

Physical properties of the thus-obtained copolymer were measured. Results obtained are shown in Table 3.

Table 4 shows the component compositions of the catalysts used in the foregoing examples and comparative example.

TABLE 3

| | Polymerization Conditions | | | | Results of Polymerization | | | |
|---|---|---|---|---|---|---|---|---|
| | TIBA[1] (mmol) | C-n | (mmol-Zr) | Hydrogen (ml) | Yield (g) | Density (g/cm$^3$) | MFR (g/10 min) | MT[2] (g) |
| Ex. 9 | 0.5 | C-7 | 0.01 | 0 | 68.4 | 0.919 | 0.40 | 11.0 |
| Comp. Ex. 2 | 0.5 | C-8 | 0.02 | 0 | 71.5 | 0.926 | 1.10 | 1.9 |
| Ex. 10 | 0.5 | C-9 | 0.01 | 0 | 84.4 | 0.924 | 0.82 | 7.5 |
| Ex. 11 | 0.5 | C-10 | 0.0015 | 50 | 39.3 | 0.923 | 1.35 | 4.5 |
| Ex. 12 | 0.5 | C-10 | 0.0015 | 40 | 50.5 | 0.920 | 0.45 | 9.4 |

TABLE 3-continued

| | Polymerization Conditions | | | Results of Polymerization | | | |
|---|---|---|---|---|---|---|---|
| | TIBA[1] (mmol) | C-n | (mmol-Zr) | Hydrogen (ml) | Yield (g) | Density (g/cm$^3$) | MFR (g/10 min) | MT[2] (g) |
| Ex. 13 | 0.5 | C-10 | 0.0015 | 60 | 32.7 | 0.927 | 3.60 | 2.2 |
| Ex. 14 | 0 | C-11 | 0.015 | 50 | 40.6 | 0.917 | 3.27 | 10.0 |

[1]Triisobutylaluminum
[2]Melt tension

TABLE 4

| | Amount of adsorbed water in silica (wt %) | Solid Catalyst Component | | | |
|---|---|---|---|---|---|
| | | (C-n) | Transitional metal compound component | MAO[1] (mg-atom/g-silica) | Zr (mmol/g-silica) | PE (mg-atom/g-silica) |
| Ex. 9 | 2.95 | C-7 | Cp$_2$ZrCl$_2$[2] | 8.3 | 0.17 | 7.5 |
| Comp. Ex. 2 | 0 | C-8 | Cp$_2$ZrCl$_2$[2] | 5.9 | 0.12 | 7.5 |
| Ex. 10 | 2.80 | C-9 | (MeCp)$_2$ZrCl$_2$[3] | 8.2 | 0.17 | 7.4 |
| Ex. 11 | 1.51 | C-10 | (1,3Me$_2$Cp)$_2$ZrCl$_2$[4] | 8.3 | 0.15 | 7.5 |
| Ex. 14 | 5.72 | C-11 | Et(Ind)$_2$ZrCl$_2$[5] | 8.1 | 0.17 | 7.5 |

[1]Methylaluminoxane
[2]Bis(cyclopentadienyl)zirconium dichloride
[3]Bis(methylcyclopendadienyl)zirconium dichloride
[4]Bis(1,3-dimethylcyclopentadienyl)zirconium dichloride
[5]Ethylenebis(indenyl)zirconium dichloride The relationships between MFR and melt tension (MT) of the polymers obtained in Examples 9–14 and Comparative Example 2 were shown in FIG. 2. The melt tension of polymers obtained by means of the same catalyst varies relative to MFR in the manner of a straight line as shown in FIG. 2.

As can be seen from FIG. 2, it is understood that the melt tension of every polymer obtained in the Examples is markedly higher than that of the polymer of the comparative example.

EXAMPLE 15

Preparation of water adsorbed carrier

A quarts tube of 45 mm in inside diameter placed in an electric furnace was charged with 150 g of silica (F-948, a product of Fuji Devison Co.), and the silica was dried under nitrogen stream at 200° C. for 4 hours and then at 700° C. for 7 hours.

Subsequently, a 500 ml egg plant type flask was charged with 30 g of the dried silica obtained above, 1.6 ml of water was added and stirred with revolving for 1 hour. In this manner, there was obtained a water adsorbed silica.

The water adsorbed silica weight 20 g was dried under a nitrogen stream at 200° C. for 4 hours, whereby a loss in weight of 1.00 g was observed. Accordingly, the amount of water contained in the water adsorbed silica becomes 5.00 % by weight.

Preparation of catalyst component (A-4)

A nitrogen purged 400 ml glass flask was charged with 85 ml of toluene and 65.2 ml of an organoaluminum oxy compound (methylaluminoxane of Schelling Co. was dried and then dissolved again in toluene, Al concentration: 1.15 gram atom/1), and the temperature of the system was decreased with stirring to 0° C. To the flask was added in a nitrogen atmosphere 9.0 g of the water adsorbed silica obtained above over a period of 30 minutes. Subsequently, reaction was carried out at 20–25° C. for 1 hour and at 80° C. for 3 hours. In this manner, there was obtained the catalyst component (A-4).

Preparation of solid catalyst (C-12)

To a nitrogen purged 400 ml glass flask charged with 150 ml of hexane were added with stirring 15 mg atom in terms of Al atom of the (A-4) obtained above, 0.02 mmol of bis(n-propylcyclopentadienyl)zirconium dichloride and 0.04 mmol of bis(1,3-dimethylcyclopentadienyl)zirconium dichloride, followed by stirring at 30° C. for 2 hours. As the result of this operation, there was obtained the solid catalyst (C-12) containing, based on I g of silica, 0.035 mg atom of zirconium and 8.8 mg atom of aluminum.

Suspension polymerization of ethylene at ordinary pressure

A nitrogen purged 1-liter glass reactor was charged with liter of purified n-decane and 0.5 mmol of triisobutylaluminum, and the temperature of the system was elevated up to 70° C. while passing therethrough ethylene at a rate of 250 1/hr and hydrogen at a rate of 0.2 1/hr. Subsequently, 0.02 mmol in terms of Zr atom of the solid catalyst (C-12) obtained above, and the system was maintained at 75° C. to carry out suspension polymerization of ethylene at ordinary pressure for 2 hours. The polymer obtained thereby amounted to 60.5 g. The polymerization activity in this case corresponds to 3030 g-PE/mmol-Zr. The thus obtained polymer had MFR of 0.8 g/10 min, Mw/Mn of 4.4 and a melt tension of 6.5 g.

Preparation of water adsorbed carrier

The water adsorbed carrier was obtained by repeating the same procedure as described in Example 15.

Preparation of catalyst component (A-5)

A nitrogen purged 400 ml glass flask was charged with 85 ml of toluene and 65.2 ml of an organoaluminum oxy compound (methylaluminoxane of Schelling Co. was dried and then dissolved again in toluene, Al concentration: 1.15 gram atom/1), and the temperature of the system was decreased with stirring to 0° C. To the flask was added in a nitrogen atmosphere 9.0 g of the water adsorbed silica obtained above over a period of 30 minutes. Subsequently, reaction was carried out at 20–25° C. for 1 hour and at 80° C. for 3 hours. In this manner, there was obtained the catalyst component (A-5).

Preparation of prepolymerization catalyst (C-13)

To a nitrogen purged 400 ml glass flask charged with 150 ml of hexane was added with stirring 15 mg atom in terms of Al atom of the (A-5) obtained above, 0.02 mmol of bis(n-propylcyclopentadienyl)zirconium dichloride, 0.04 mmol of bis(1,3-dimethylcyclopentadienyl)zirconium dichloride and 1.5 mmol of triisobutylaluminum, and ethylene gas (ordinary pressure) was continuously introduced into the flask to carry out prepolymerization at 30° C. for 2 hours. As the result of this operation, there was obtained the prepolymerization catalyst (C-13) containing, based on 1 g of silica, 0.033 mg atom of zirconium, 9.0 mg atom of aluminum and 6.9 g of polyethylene.

Suspension polymerization of ethylene at ordinary pressure

A nitrogen purged 1-liter glass polymerizer was charged with 1 liter of purified n-decane and 0.5 mmol of triisobutylaluminum, and the temperature of the system was elevated up to 70° C. awhile passing therethrough ethylene at a rate of 250 l/hr and hydrogen at a rate of 0.15 l/hr. Subsequently, 0.02 mmol in terms of Zr atom of the prepolymerization catalyst (C-13) obtained above, and the system was maintained at 75° C. to carry suspension polymerization of ethylene at ordinary pressure for 2 hours. The polymer obtained thereby amounted to 72.2 g. The polymerization activity in this case corresponds to 3610 g-PE/mmol-Zr.

The polymer thus obtained had MFR of 0.65 g/10 min, Mw/Mn of 4.2 and a melt tension of 7 g.

What is claimed is:

1. A process for the polymerization of olefin which comprises polymerizing or copolymerizing olefin in the presence of a solid catalyst for olefin polymerization comprising
    a particulate carrier composed of (i) an oxide of at least one element selected from among those belonging to the groups II, III and IV of the periodic table and containing (ii) at least 1.0% by weight of water,
    an organoaluminum oxy compound, and
    a transition metal compound of metal belonging to the group IV B of the periodic table containing a ligand having a cyclopentadieny skeleton,
    wherein the organoaluminum oxy compound and the transition metal compound are supported on the particulate carrier.

2. The process for the polymerization of olefin as claimed in claim 1 wherein said transition metal compound includes at least two kinds of transition metal compounds of metals belonging to the group IV B of the periodic table containing ligands having a cyclopentadienyl skeleton.

3. A process for the polymerization of olefin which comprises polymerizing or copolymerizing olefin in the presence of a solid catalyst for olefin polymerization comprising
    a particulate carrier composed of (i) an oxide of at least one element selected from among those belonging to the groups II, III and IV of the periodic table, and containing (ii) at least 1.0% by weight of water,
    an organoaluminum oxy compound, and
    a transition metal compound of a metal belonging to the group IV B of the periodic table containing a ligand having a cyclopentadienyl skeleton,
    wherein the organoaluminum oxy compound and the transition metal compound are supported on the particulate carrier, and
    an organoaluminum compound.

4. A process for the polymerization of olefin which comprises polymerizing or copolymerizing olefin in the presence of a solid catalyst for olefin polymerization comprising
    a particulate carrier composed of (i) an oxide of at least one element selected from among those belonging to the groups II, III and IV of the periodic table, and containing (ii) at least 1.0 % by weight of water,
    an organoaluminum oxy compound,
    a transition metal compound of a metal belonging to the group IV B of the periodic table containing a ligand having a cyclopentadienyl skeleton and
    an organoaluminum compound,
    wherein the organoaluminum oxy compound, the transition metal and the organoaluminum compound are supported on the particulate carrier.

5. The process for the polymerization of olefin as claimed in claim 4 wherein said transition metal compound includes at least two kinds of transition metal compounds of metals belonging to the group IV B of the periodic table containing ligands having a cyclopentadieny skeleton.

6. A process for the polymerization of olefin which comprises polymerizing or copolymerizing olefin in the presence of a prepolymerized catalyst for olefin polymerization which comprises a solid catalyst comprising
    a particulate carrier composed of (i) an oxide of at least one element selected from among those belonging to the groups II, III and IV of the periodic table, and containing (ii) at least 1.0 % by weight of water,
    an organoaluminum oxy compound,
    a transition metal compound of a metal belonging to the group IV B of the periodic table containing a ligand having a cyclopentadienyl skeleton, and
    a prepolymerized polyolefin formed on the solid catalyst
    wherein in the prepolymerized catalyst the organoaluminum oxy compound and the transition metal compound are supported on the particulate carrier.

7. The process for the polymerization of olefin as claimed in claim 6 wherein said transition metal compound includes at least two kinds of transition metal compounds of metals belonging to the group IV B of the periodic table containing ligands having a cyclopendadienyl skeleton.

8. A process for the polymerization of olefin which comprises polymerizing or copolymerizing olefin in the presence of a prepolymerized catalyst for olefin polymerization and an organoaluminum compound, said prepolymerized catalyst which comprises a solid catalyst comprising
    a particulate carrier composed of (i) an oxide of at least one element selected from among those belonging to the groups II, III and IV of the periodic table and containing (ii) at least 1.0 % by weight of water,
    an organoaluminum oxy compound, a transition metal compound of a metal belonging to the group IV B of the periodic table containing a ligand having a cyclopentadienyl skeleton, and a prepolymerized polyolefin formed on the solid catalyst wherein in the prepolymerized catalyst the organoaluminum oxy compound and the transition metal compound are supported on the particulate carrier.

9. The process for the polymerization of olefin as claimed in claim 8 wherein said transition metal compound includes at least two kinds of transition metal compounds of metals belonging to the group IV B of the periodic table containing ligands having a cyclopentadienyl skeleton.

10. A process for the polymerization of olefin which comprises polymerizing or copolymerizing olefin in the presence of a prepolymerized catalyst for olefin polymerization which comprises a solid catalyst comprising a particulate carrier composed of (i) an oxide of at least one element selected from among those belonging to the groups II, III and IV of the periodic table and containing (II) at least 1.0 % by weight of water, an organoaluminum oxy compound, and a transition metal of metal belonging to the group IV B of the periodic table containing a ligand having a cyclopentadienyl skeleton, and an organoaluminum compound, and a prepolymerized polyolefin formed on the solid catalyst wherein in the prepolymerized catalyst the organoaluminum oxy compound and the transition metal compound are supported on the particulate carrier.

11. The process for the polymerization of olefin as claimed in claim 10 wherein said transition metal compound includes at least two transition metal compounds of metals belonging to the group IV B of the periodic table containing ligands having a cyclopentadieny skeleton.

12. A process for the polymerization of olefin which comprises polymerizing or copolymerizing olefin in the presence of a prepolymerized catalyst for olefin polymerization and an organoaluminum compound, said prepolymerized catalyst for olefin polymerization which comprises a solid catalyst comprising a particulate carrier composed of (i) an oxide of at least one element selected from among those belonging to the groups II, III and IV of the periodic table and containing (ii) at least 1.0 % by weight of water, an organoaluminum oxy compound, a transition metal compound of a metal belonging to the group IV B of the periodic table containing a ligand having a cyclopentadieny skeleton, and an organoaluminum compound, and a prepolymerized polyolefin formed on the solid catalyst wherein in the prepolymerized catalyst the organoaluminum oxy compound, the transition metal and the organoaluminum compound are supported on the particulate carrier.

13. The process for the polymerization of olefin as claimed in claim 12 wherein said transition metal compound includes at least two kinds of transition metal compounds of metals belonging to the group IV B of the periodic table containing ligands having a cyclopentadieny skeleton.

* * * * *